(12) United States Patent
Yoshizawa

(10) Patent No.: US 10,476,320 B2
(45) Date of Patent: Nov. 12, 2019

(54) POWER TRANSMISSION DEVICE

(71) Applicant: Daisuke Yoshizawa, Aichi (JP)

(72) Inventor: Daisuke Yoshizawa, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 99 days.

(21) Appl. No.: 15/898,185

(22) Filed: Feb. 15, 2018

(65) Prior Publication Data
US 2018/0248416 A1 Aug. 30, 2018

(30) Foreign Application Priority Data

Feb. 28, 2017 (JP) ................. 2017-037102

(51) Int. Cl.
*H02J 50/90* (2016.01)
*H02J 50/10* (2016.01)
*H02J 50/12* (2016.01)
*H02J 7/02* (2016.01)

(52) U.S. Cl.
CPC ............. *H02J 50/90* (2016.02); *H02J 50/10* (2016.02); *H02J 50/12* (2016.02); *H02J 7/025* (2013.01)

(58) Field of Classification Search
CPC .. H02J 50/10; H02J 50/12; H02J 50/90; H02J 7/025
See application file for complete search history.

(56) References Cited

U.S. PATENT DOCUMENTS

| 2012/0229140 A1 | 9/2012 | Shimokawa |
| 2015/0222148 A1 | 8/2015 | Sampei et al. |

FOREIGN PATENT DOCUMENTS

| JP | 2015-144508 A | 8/2015 |
| JP | 2016-005311 A | 1/2016 |
| WO | 2011/070637 A1 | 6/2011 |

*Primary Examiner* — Hal Kaplan

(74) *Attorney, Agent, or Firm* — Osha Liang LLP

(57) ABSTRACT

A power transmission device wirelessly transmits power to a power receiving device. The power transmission device includes: a power transmission circuit; a first power transmission coil that transmits the power by a first transmission method using an electric signal generated by the power transmission circuit; a second power transmission coil that transmits the power by a second transmission method using the electric signal; a first power transmission coil position moving unit that moves a position of the first power transmission coil in a direction perpendicular to a coil surface; and a control unit that controls the first power transmission coil position moving unit to move the first power transmission coil in a direction away from the power receiving device, in a case where the power transmission circuit generates the electric signal so as to transmit the power from the second power transmission coil.

2 Claims, 4 Drawing Sheets

POWER TRANSMISSION DEVICE

CROSS-REFERENCES TO RELATED APPLICATIONS

This application is based upon and claims the benefit of priority from Japanese Patent Application No. 2017-037102, filed on Feb. 28, 2017, the entire contents of which are incorporated herein by reference.

FIELD

One or more embodiments of the invention relate to a power transmission device which wirelessly transmits power to a power receiving device, and more particularly relate to a power transmission device which transmits power in a contactless manner by using two different coexisting coils.

BACKGROUND

In the related art, a power transmission device has been proposed which wirelessly transmits power to a power receiving device. For example, JP-A-2015-144508 discloses a wireless power transmission system which can correspond to two transmission methods and can suppress poor power transmission efficiency from the power transmission device to the power receiving device. The wireless power transmission system wirelessly transmits the power from the power transmission device to the power receiving device by using magnetic field coupling between a power transmission coil and a power receiving coil. The power transmission device has a power transmission circuit that generates an electric signal for power transmission, a first power transmission coil that corresponds to a first transmission method, a second power transmission coil that corresponds to a second transmission method, a first magnetic substance on which the first power transmission coil is placed, a second magnetic substance on which the second power transmission coil is placed, and a power supply surface on which the power receiving device is placed. A first attachment surface of the first magnetic substance and a second attachment surface of the second magnetic substance are located on a lower side of the power supply surface, and are disposed on the same plane parallel to the power supply surface. In the power transmission device, a magnetic flux generated by the first power transmission coil is concentrated inside the first magnetic substance. In this manner, the power transmission device can suppress the magnetic field coupling between the first power transmission coil and the second power transmission coil. In addition, a magnetic flux generated by the second power transmission coil is concentrated inside the second magnetic substance. In this manner, the power transmission device can suppress the magnetic field coupling between the first power transmission coil and the second power transmission coil.

Pamphlet of International Publication No. WO2011/070637 discloses a magnetic field resonance wireless power transmission system whose power transmission efficiency is improved by transmitting power using magnetic field resonance from the power transmission device to the power receiving device. A magnetic field resonance power transmission device in the magnetic field resonance wireless power transmission system includes a resonance coil, a power supply unit that supplies the power to the resonance coil so as to generate a magnetic field, a magnetic substance that changes the magnetic field generated by the resonance coil, and a position adjustment unit that adjusts a position relationship between the resonance coil and the magnetic substance. The power supply unit causes the resonance coil to generate an alternating current having a frequency the same as a transmission frequency. In a case where a measured current flowing through the resonance coil and a measured magnetic field do not reach the maximum value, the position adjustment unit adjusts a position of a magnetic field shield by rotating a position adjustment screw so that both of these reach the maximum value. Through this adjustment, a resonance frequency of the resonance coil can be adjusted to a target frequency.

JP-A-2016-005311 discloses a contactless power supply device for vehicle in which each position of a power supply coil of a housing and a power receiving coil of a portable terminal is automatically adjusted. The contactless power supply device for vehicles is installed inside a passenger compartment of a vehicle, and can support the portable terminal. The contactless power supply device for vehicles includes the housing including the power supply coil for supplying power to the portable terminal, an ECU, and a left arm and a right arm which support the portable terminal. Based on a distance between the power supply coil and the left arm and the right arm and a shape of the portable terminal detected by the ECU, the ECU detects a difference from a distance between the power receiving coil of the portable terminal and a portion of the portable terminal. The ECU controls the left arm and the right arm to move so that the difference between the distances falls within a predetermined range. Each position of the left arm and the right arm is automatically adjusted so that the power supply coil portion of the housing and a center position of the power receiving coil portion of the portable terminal are close to each other. Therefore, the contactless power supply device for vehicles can efficiently supply the power to the portable terminal, even if an occupant does not manually adjust the position.

SUMMARY

In recent years, while portable terminals such as smartphones have come into wide use, many standards for contactless charging have been introduced. For example, the Qi standard, the PMA standard, and the A4WP standard have been introduced so far. Some of the standards are mutually compatible or incompatible in terms of hardware and software. The Qi standard and the PMA standard adopt an electromagnetic induction method, and can share the hardware (power transmission coil). On the other hand, the A4WP standard adopts a magnetic field resonance method, and is incompatible with the Qi standard in using the power transmission coil. Thus, the A4WP standard requires a dedicated power transmission coil. In view of usability of users, it is preferable that a single contactless charger can correspond to many standards.

However, if both the power transmission coil conforming to the Qi standard/the PMA standard and the power transmission coil conforming to the A4WP standard are disposed in a miniaturized device, the coils interfere with each other due to mutual inductance. Consequently, an inductance value fluctuates, thereby causing poor charging performance. It is understood that the poor performance conspicuously occurs in a case of the magnetic field resonance method as in the A4WP standard.

One or more embodiments of the invention are made in view of the above-described circumstances, and an object thereof is to provide a power transmission device having satisfactory charging efficiency by reducing the influence of mutual inductance in two power transmission coils conforming to mutually different standards.

In order to solve the above-described problem, there is provided a power transmission device which wirelessly transmits power to a power receiving device. The power transmission device includes a power transmission circuit that generates an electric signal, a first power transmission coil that transmits the power by a first transmission method using the electric signal generated by the power transmission circuit, a second power transmission coil that transmits the power by a second transmission method using the electric signal generated by the power transmission circuit, a first power transmission coil position moving unit that moves a position of the first power transmission coil in a direction perpendicular to a coil surface, and a control unit that controls the first power transmission coil position moving unit to move the first power transmission coil in a direction away from the power receiving device, in a case where the power transmission circuit generates the electric signal so as to transmit the power from the second power transmission coil.

According to this configuration, in a case where the power is transmitted from one of the power transmission coils, the other of the power transmission coils is moved in a direction away from the power receiving device. In this manner, it is possible to provide the power transmission device having satisfactory charging efficiency by reducing the influence of mutual inductance.

Furthermore, the first power transmission coil may correspond to an electromagnetic induction method. The second power transmission coil may correspond to a magnetic field resonance method.

According to this configuration, in a case where the power is transmitted from a magnetic field resonance type power transmission coil in a charging device conforming to both the magnetic field resonance method and the electromagnetic induction method, the electromagnetic induction type power transmission coil is moved in a direction away from the power receiving device. In this manner, the influence of the mutual inductance is reduced, and thus, it is possible to provide the power transmission device having the satisfactory charging efficiency when charging is performed by the magnetic field resonance type power transmission coil.

As described above, according to one or more embodiments of the invention, it is possible to provide the power transmission device having the satisfactory charging efficiency by reducing the influence of the mutual inductance in two power transmission coils conforming to mutually different standards.

DETAILED DESCRIPTION

Figure 1A:
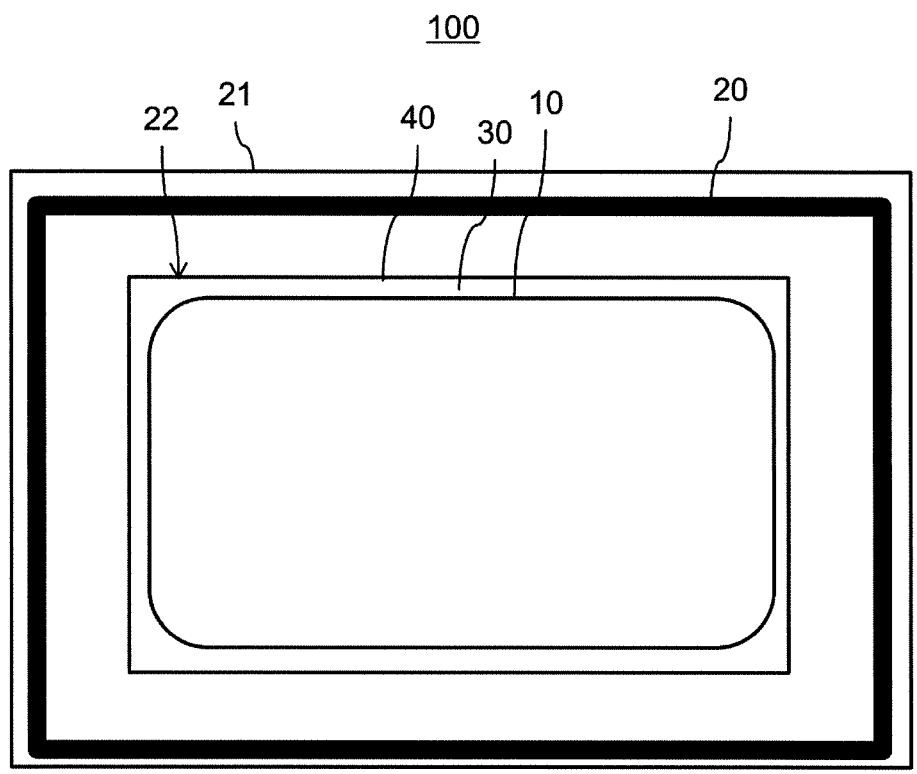
FIG. 1A is a plan view (excluding a case including a power supply surface) of a power transmission device according to a first embodiment of the invention.

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, an embodiment of the invention will be described with reference to the drawings. First, referring to FIGS. 4A and 4B, a power transmission device 100Z in the related art will be described. In the drawings, a housing of the power transmission device 100Z is not illustrated, and a coil accommodated inside the housing is mainly illustrated. The power transmission device 100Z wirelessly transmits power to a power receiving device RD such as a smartphone. The power receiving device RD internally has a power receiving function which is applicable to a transmission method of the power transmission device 100Z, and is placed on a power supply surface 60 of the housing of the power transmission device 100Z. In this manner, the power receiving device RD is charged by receiving power supplied from the power transmission device 100Z.

The power transmission device 100Z includes a first power transmission coil 10 that transmits the power by using an electromagnetic induction method, and a second power transmission coil 20 that transmits the power by using a magnetic field resonance method. The electromagnetic induction method is used in transmitting the power by causing a power receiving side coil to generate an electromotive force by means of electromagnetic induction caused due to a change in a magnetic field generated by a power transmission side coil. The magnetic field resonance method is used in transmitting the power by matching a frequency of the power transmission side coil and a frequency of the power receiving side coil, and in such a way that vibrations of the magnetic field generated by a current flowing in the power transmission side coil are transmitted to a power receiving side resonance circuit which resonates at the same frequency.

According to the electromagnetic induction method, a magnitude of the magnetic flux greatly affects power transmission efficiency, and a magnitude of a coupling coefficient between the power transmitting side coil and the power receiving side coil determines a magnitude of the transmitted power. The magnitude of the coupling coefficient is affected by a distance between both coils or a coincidence degree of coil center positions. According to the magnetic field resonance method, the magnitude of the magnetic flux may be small. Instead, a height of peaky performance (property which sensitively responds to a prescribed frequency) in the power transmitting side coil and the power receiving side coil (antenna) greatly affects the power transmission efficiency. According to the magnetic field resonance method, the magnitude of the magnetic flux rarely relates to the power transmission efficiency. Accordingly, the magnetic field resonance method has a characteristic that the power can be transmitted even if the power transmission side coil and the power receiving side coil are separated from each other. On the other hand, the power transmission efficiency is likely to receive the influence of surrounding coils or the magnetic flux. That is, in the power transmission efficiency according to the magnetic field resonance method, it is important how closely a resonance frequency of the power transmission side coil can coincide with a resonance frequency of the power receiving side coil.

In particular, in the power transmission device such as the power transmission device 100Z including the first power transmission coil 10 using the electromagnetic induction method and the second power transmission coil 20 using the magnetic field resonance method, the power transmission device receives the influence of mutual inductance between the power transmission side coil and the power receiving side coil. That is, the reason is as follows. In the vicinity of the second power transmission coil 20 using the magnetic field resonance method, the first power transmission coil 10 using its own electromagnetic induction method is present, and the power receiving coil of the power receiving device RD approaching the vicinity in order to improve the power transmission efficiency in the electromagnetic induction method is also present.

Figure 4A:
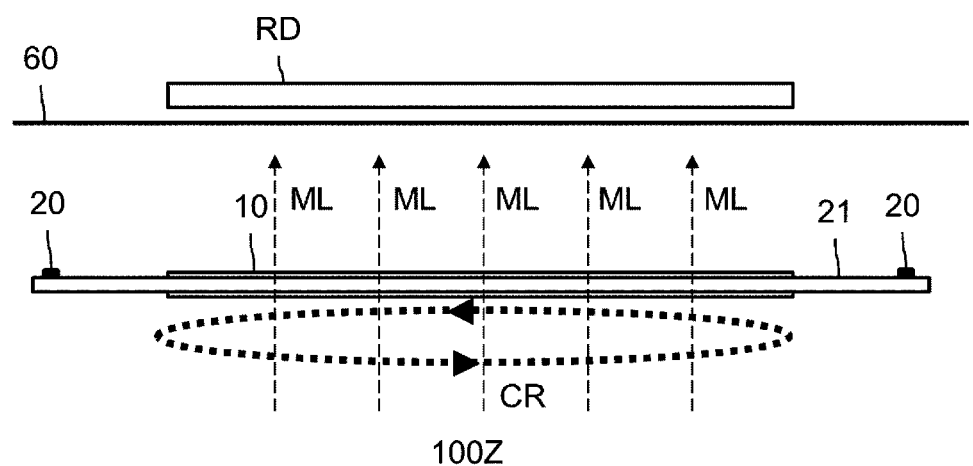
FIG. 4A is a schematic view illustrating that a current flows in an electromagnetic induction coil due to a magnetic flux generated by a magnetic field resonance coil in a power transmission device in the related art.

As illustrated in the drawings, in the power transmission device 100Z, the first power transmission coil 10 using the electromagnetic induction method and the second power transmission coil 20 using the magnetic field resonance method are located in the vicinity of the power supply surface 60, that is, in the vicinity of the power receiving device RD. Both of these are located with approximately the same distance from the power receiving side coil of the power receiving device RD. FIG. 4A illustrates that an upward magnetic flux ML is generated by a current flowing in the second power transmission coil 20 using the magnetic field resonance method. In this case, the magnetic flux ML interlinks with the first power transmission coil 10 using the electromagnetic induction method, and in compliance with the interlinkage, a current CR flows in the first power transmission coil 10 using the electromagnetic induction method.

Figure 4B:
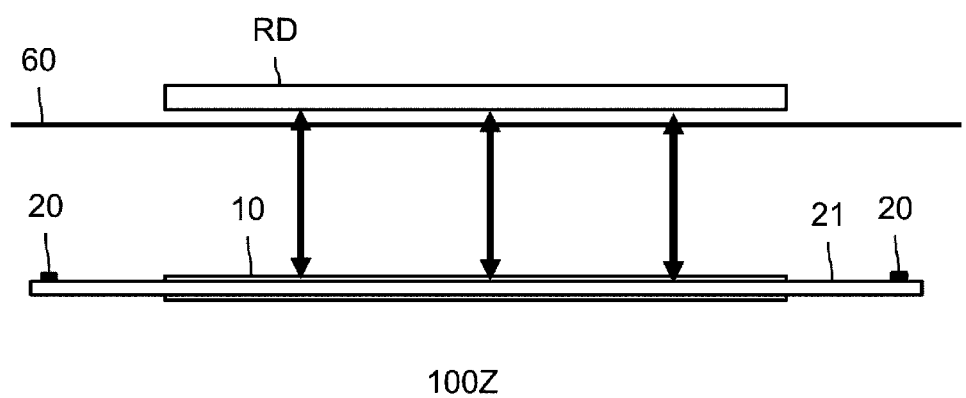
FIG. 4B is a schematic view illustrating that the power transmission device is coupled to a power receiving device by the current flowing in the electromagnetic induction coil.

In this case, as illustrated in FIG. 4B, coupling occurs between the first power transmission coil 10 using the electromagnetic induction method and the power receiving side coil of the power receiving device RD. If the coupling occurs, the mutual inductance is changed, and the resonance frequency of the power receiving side coil fluctuates. Consequently, due to high peaky performance, the second power transmission coil 20 using the magnetic field resonance method comes to have poor power transmission efficiency. If a smartphone of the power receiving device RD is moved on the power supply surface 60 and a distance fluctuates between the first power transmission coil 10/the second power transmission coil 20 and the power receiving side coil, the mutual inductance may vary in some cases. If the mutual inductance fluctuates as described above, the fluctuation causes poor charging performance of the power transmission device 100Z which charges the power receiving device RD.

First Embodiment

Figure 1B:
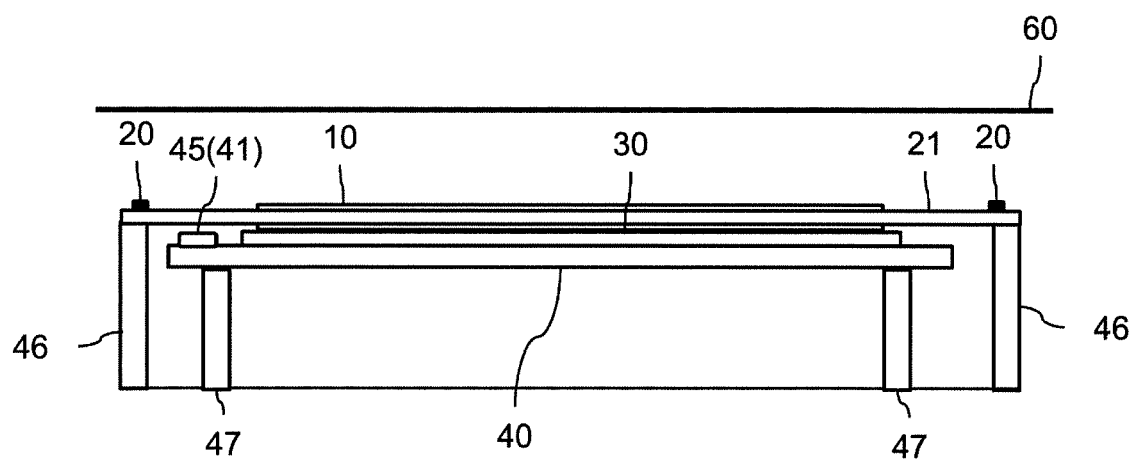
FIG. 1B is a side view (illustrates only the power supply surface in the case)

Referring to FIG. 1, the power transmission device 100 according to the present embodiment will be described. FIG. 1A does not illustrate a case of the power transmission device 100, and illustrates only an internal coil. FIG. 1B illustrates only the power supply surface 60 in the case. The power transmission device 100 wirelessly transmits the power to the power receiving device RD such as the portable terminal, and has the power supply surface 60 on which the power receiving device RD is placed. As a so-called wireless charging method of wirelessly supplying the power to the power receiving device RD such as the portable terminal, the power transmission device 100 employs both the electromagnetic induction method using electromagnetic waves having frequencies of approximately several tens kHz to several hundreds kHz and the magnetic field resonance method using electromagnetic waves having frequencies of approximately several MHz to several tens MHz.

In order to correspond to the two different wireless charging methods, the power transmission device 100 includes the first power transmission coil 10 that transmits the power by using the electromagnetic induction method (first transmission method) and the second power transmission coil 20 that transmits the power by using the magnetic field resonance method (second transmission method). More specifically, the power transmission device 100 includes a control board 40 having a rectangular shape in a plan view, a magnetic substance 30 for strengthening a magnetic field in a rectangular plate shape on the control board 40, a first power transmission coil 10 disposed so as to be stacked on the power supply surface 60 side of the magnetic substance 30, a second power transmission coil board 21 disposed to face the control board 40 in parallel and electrically connected to the control board 40, a second power transmission coil 20 disposed on the second power transmission coil board 21, a first power transmission coil position moving unit 47 that moves the control board 40, and a control unit 45 that controls the first power transmission coil position moving unit 47.

The first power transmission coil 10 is disposed to be fit into an opening portion 22 of the second power transmission coil board 21. Therefore, the first power transmission coil 10 is disposed at a position where the distance from the power supply surface 60 of the first power transmission coil 10 is substantially the same as the distance from the power supply surface 60 of the second power transmission coil 20. The first power transmission coil 10 is located on the coil center side of the second power transmission coil 20. The magnetic substance 30 is configured to include a material having magnetic permeability of 1 or more such as ferrite, and has a rectangular plate shape. A shape in a plan view is substantially the same as the rectangular shape of the opening portion 22 of the second power transmission coil board 21. The magnetic substance 30 is disposed so as to coincide with the opening portion 22. The first power transmission coil 10 is a spiral coil wound in a rectangular and annular shape by using a wiring pattern of conductors formed on the control board 40.

The second power transmission coil 20 is disposed in a frame portion interposed between the opening portion 22 and an outer peripheral portion of the second power transmission coil board 21. The second power transmission coil 20 is a rectangular shaped antenna formed by a wiring pattern of conductors formed on the second power transmission coil board 21. Unlike the first power transmission coil 10 coupled using the strength of the magnetic flux, the second power transmission coil 20 is not necessarily wound several times for the magnetic field resonance. The second power transmission coil 20 resonates at a predetermined frequency by using its own inductance and stray capacitance.

Figure 2A:
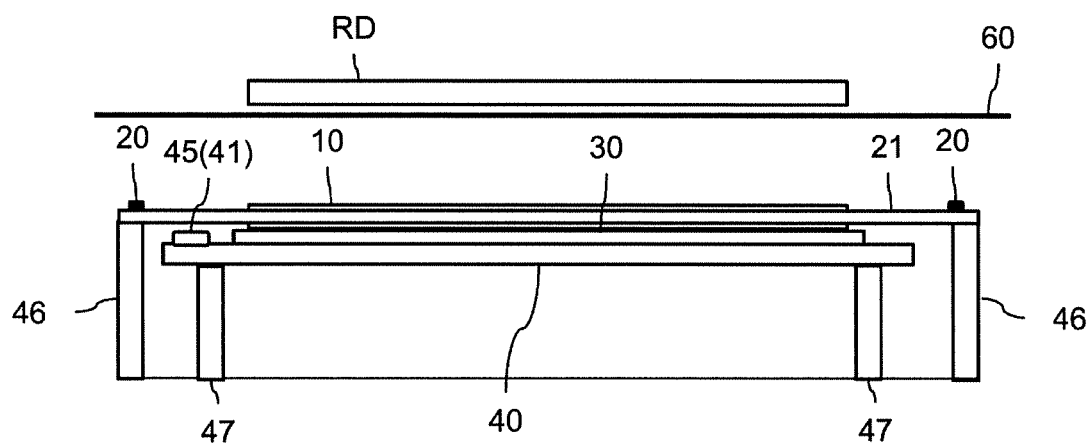
FIG. 2A is a side view (illustrates only the power supply surface in the case) in a case where power is transmitted from an electromagnetic induction type coil of the power transmission device according to the first embodiment of the invention.
Figure 2B:
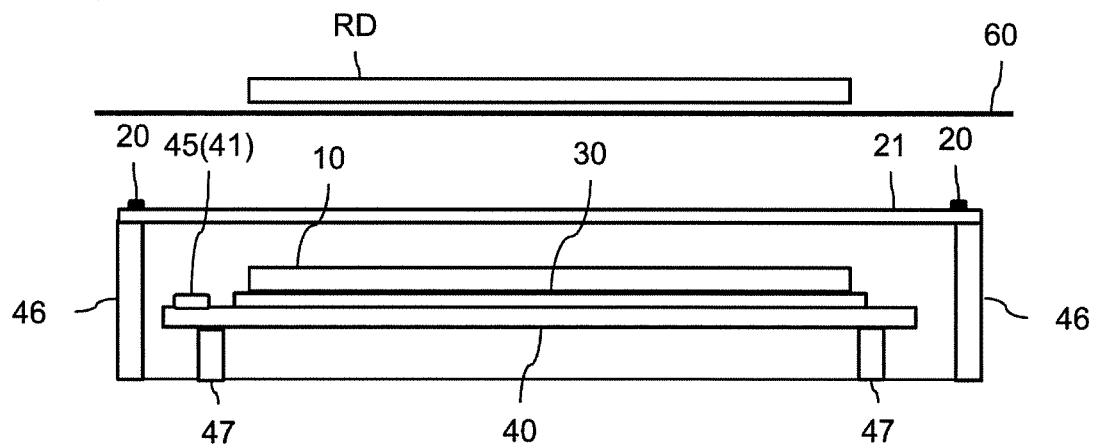
FIG. 2B is a side view (illustrates only the power supply surface in the case) in a case where power is transmitted from a magnetic field resonance type coil.

As illustrated in FIGS. 2A and 2B, the second power transmission coil board 21 having the second power transmission coil 20 is supported and fixed by the second power transmission coil support unit 46. On the other hand, the control board 40 having the first power transmission coil 10 formed thereon is supported by the first power transmission coil position moving unit 47, and the first power transmission coil position moving unit 47 expands and contracts, thereby moving the control board 40 in the direction perpendicular to the coil surface, that is, in the direction away from the power supply surface 60 (downward direction in the drawing) and in the direction close to the power supply surface 60 (upward direction in the drawing). In the present embodiment, the first power transmission coil position moving unit 47 moves the control board 40 in the upward and downward direction by expanding and contracting in the axial direction in which the control board 40 is supported. However, any known technique/mechanism capable of moving the control board 40 in the direction perpendicular to the coil surface may be used. For example, the first power transmission coil position moving unit 47 may be a mechanism that supports the control board 40 from the side surface and that moves the control board 40 in the direction perpendicular to the board surface of the control board 40.

In a case where the control unit 45 generates an electric signal so that a power transmission circuit 41 transmits the power from the first power transmission coil 10 using the electromagnetic induction method, it is preferable to apply a strong magnetic flux to the power receiving device RD. Accordingly, for example, as illustrated in FIG. 2A, the first power transmission coil 10 is disposed at a position relatively close to the power supply surface 60. On the other hand, in a case where the control unit 45 generates the electric signal so that the power transmission circuit 41 transmits the power from the second power transmission coil 20 using the magnetic field resonance method, the control unit 45 controls the first power transmission coil position moving unit 47, and moves the first power transmission coil 10 in the direction perpendicular to the coil surface, that is, in the direction away from the power receiving device RD and the power supply surface 60. As described above, in a case where the power is transmitted from the second power transmission coil 20, if the first power transmission coil 10 using the electromagnetic induction method and the power receiving side coil of the power receiving device RD are close to each other, both of these are coupled to each other. Consequently, the mutual inductance is changed, and the power transmission efficiency becomes poor.

FIG. 2A illustrates a state where the first power transmission coil 10 is located relatively close to the second power transmission coil 20 and the power supply surface 60 in a case where the power is transmitted from the first power transmission coil 10. FIG. 2B illustrates a state where the first power transmission coil position moving unit 47 moves the control board 40 in the direction away from the power supply surface 60 (downward in the drawing) and the first power transmission coil 10 is located away from the power supply surface 60 in a case where the power is transmitted from the second power transmission coil 20. In this way, in a case where the power is transmitted from the second power transmission coil 20 using the magnetic field resonance method in the charging device conforming to both standards of the magnetic field resonance method and the electromagnetic induction method, the first power transmission coil 10 using the electromagnetic induction method is moved in the direction away from the power receiving device RD so as to reduce the influence of the mutual inductance. Accordingly, it is possible to provide the power transmission device 100 having the satisfactory charging efficiency when the charging is performed by the second power transmission coil 20 using the magnetic field resonance method.

The power transmission device 100 further includes the power transmission circuit 41 that generates the electric signal for the first power transmission coil 10 and the second power transmission coil 20, on the control board 40. The power transmission circuit 41 internally has a first power transmission circuit corresponding to the first power transmission coil 10 and a second power transmission circuit corresponding to the second power transmission coil 20, which are configured to include a circuit such as an inverter circuit. The first power transmission circuit generates the electric signal for power transmission corresponding to the electromagnetic induction method. As the electric signal corresponding to the electromagnetic induction method, the electric signal of an alternating current having a frequency of approximately several tens kHz to several hundreds kHz is usually used. The second power transmission circuit generates the electric signal for power transmission corresponding to the magnetic field resonance method. As the electric signal corresponding to the magnetic field resonance method, the electric signal of the alternating current having a frequency of approximately several MHz to several tens MHz is usually used.

In addition to the power transmission circuit 41, the control board 40 has a detection circuit, a control circuit, and a switch (not illustrated). Based on a predetermined control signal or operation, the control board 40 can select whether to transmit the power by using any one of the electromagnetic induction method and the magnetic field resonance method. The power transmission circuit 41 applies the generated electric signal to the first power transmission coil 10 or the second power transmission coil 20 using selected method. The detection circuit is installed in the vicinity of the power supply surface 60, and detects a signal of the power receiving device RD. In this manner, for example, based on the frequency of the received signal, the detection circuit determines whether the power receiving device RD is the power receiving device using the electromagnetic induction method or the power receiving device using the magnetic field resonance method. If necessary, the power transmission circuit 41 can simultaneously apply the electric signals to the first power transmission coil 10 and the second power transmission coil 20.

Figure 3:
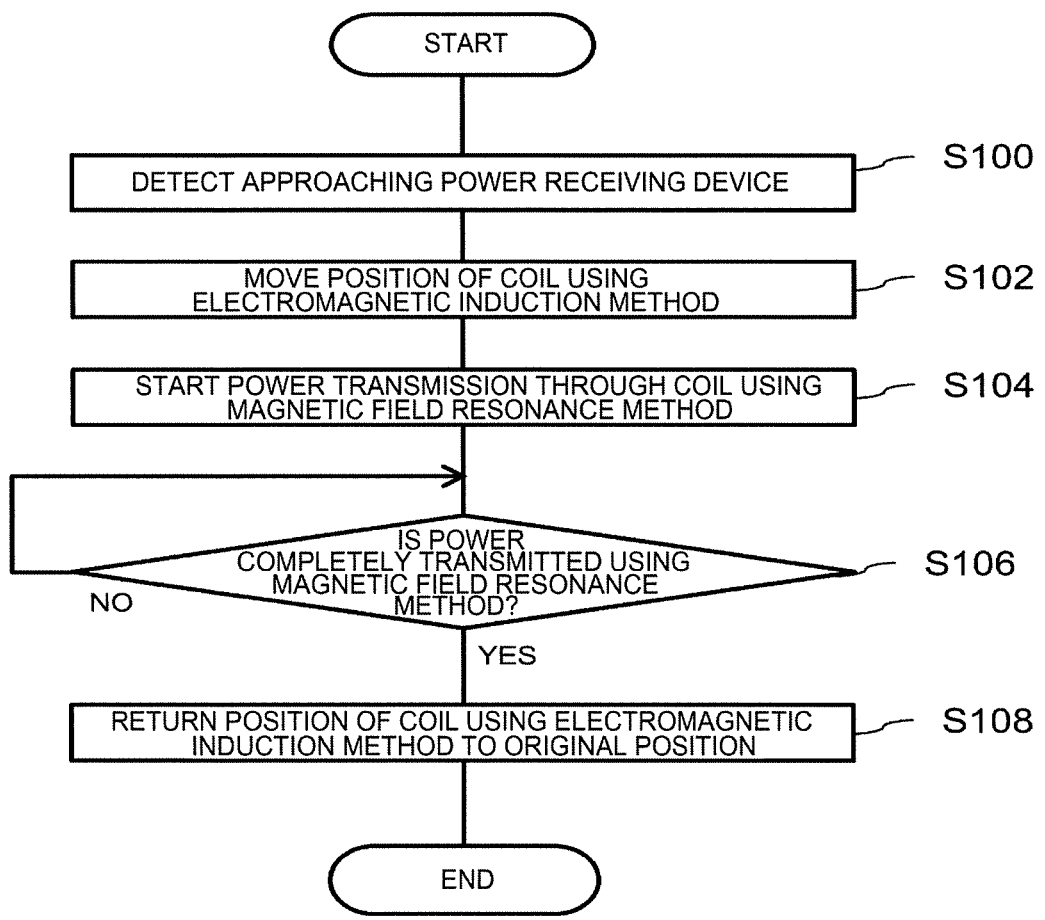
FIG. 3 is a flowchart illustrating a control method used in the power transmission device according to the first embodiment of the invention.

Referring to FIG. 3, a control method when the power transmission circuit 41 generates the electric signal for the first power transmission coil 10 and the second power transmission coil 20 will be described. The reference numeral S in the flowchart means a step. The drawing is illustrated for describing a case of charging the power receiving device RD using the magnetic field resonance method. In S100, the power transmission device 100 causes the detection circuit to detect whether the power receiving device RD using any method approaches the power supply surface 60. Based on the frequency, the power transmission device 100 detects that the power receiving device RD using the magnetic field resonance method approaches the power supply surface 60.

In S102, the control unit 45 of the power transmission device 100 controls the first power transmission coil position moving unit 47 so that the first power transmission coil 10 using the electromagnetic induction method and the coil of the power receiving device RD are not coupled to each other, and moves the position of the first power transmission coil 10 in the direction away from the power supply surface 60.

In S104, in order to transmit the power to the power receiving device RD using the magnetic field resonance method, the power transmission circuit 41 of the power transmission device 100 generates and applies the electric signal having the frequency corresponding to the magnetic field resonance method, to the second power transmission coil 20. In this manner, the power transmission device 100 starts power transmission through the second power transmission coil 20 using the magnetic field resonance method.

In S106, the power transmission device 100 checks whether or not the power is completely transmitted using the magnetic field resonance method. For example, the power transmission device 100 detects a case where a full charge signal is received from the power receiving device RD or a case where the power receiving device RD is away from the power supply surface 60 and cannot be detected. The power transmission device 100 continues the power transmission until the power is completely transmitted. In a case where the power transmission device 100 detects that the power is completely transmitted, the power transmission device 100 completes the power transmission from the second power transmission coil 20 using the magnetic field resonance method.

In S108, the control unit 45 controls the first power transmission coil position moving unit 47, moves the position of the first power transmission coil 10 in the direction close to the power supply surface 60, and returns the position to the original position. In this way, in a case where the power transmission device 100 transmits the power through the first power transmission coil 10 using the electromagnetic induction method, the power transmission device 100 transmits the power at a position close to the power receiving device RD. In a case where the power is transmitted through the second power transmission coil 20 using the magnetic field resonance method, the power transmission device 100 transmits the power by moving the first power transmission coil 10 in the direction away from the power receiving device RD so that both of these are not coupled to each other. In this manner, it is possible to provide the power transmission device 100 having the satisfactory charging efficiency by reducing the influence of the mutual inductance in two charging coils conforming to mutually different standards.

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:

1. A power transmission device which wirelessly transmits power to a power receiving device, the power transmission device comprising:
    a power transmission circuit that generates an electric signal;
    a first power transmission coil that transmits the power by a first transmission method using the electric signal generated by the power transmission circuit;
    a second power transmission coil that transmits the power by a second transmission method using the electric signal generated by the power transmission circuit;
    a first power transmission coil position moving unit that moves a position of the first power transmission coil in a direction perpendicular to a coil surface; and
    a control unit that controls the first power transmission coil position moving unit to move the first power transmission coil in a direction away from the power receiving device, in a case where the power transmission circuit generates the electric signal so as to transmit the power from the second power transmission coil.

2. The power transmission device according to claim 1, wherein the first power transmission coil corresponds to an electromagnetic induction method, and
wherein the second power transmission coil corresponds to a magnetic field resonance method.

\* \* \* \* \*